Patented Jan. 20, 1925.

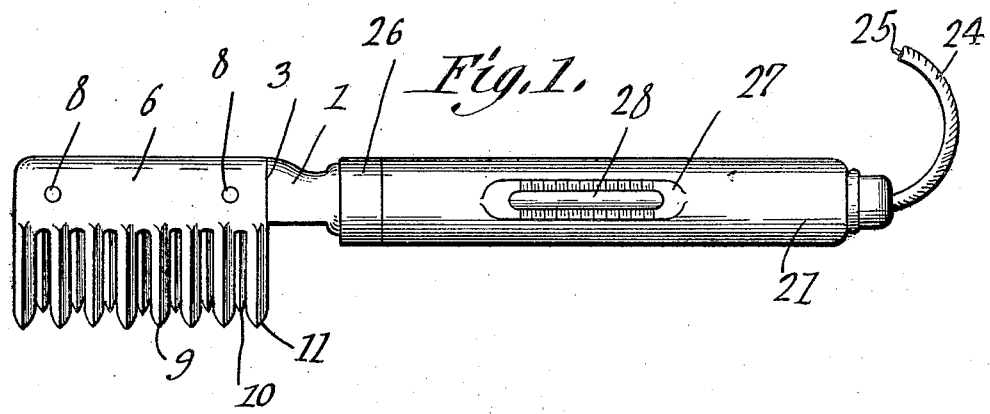
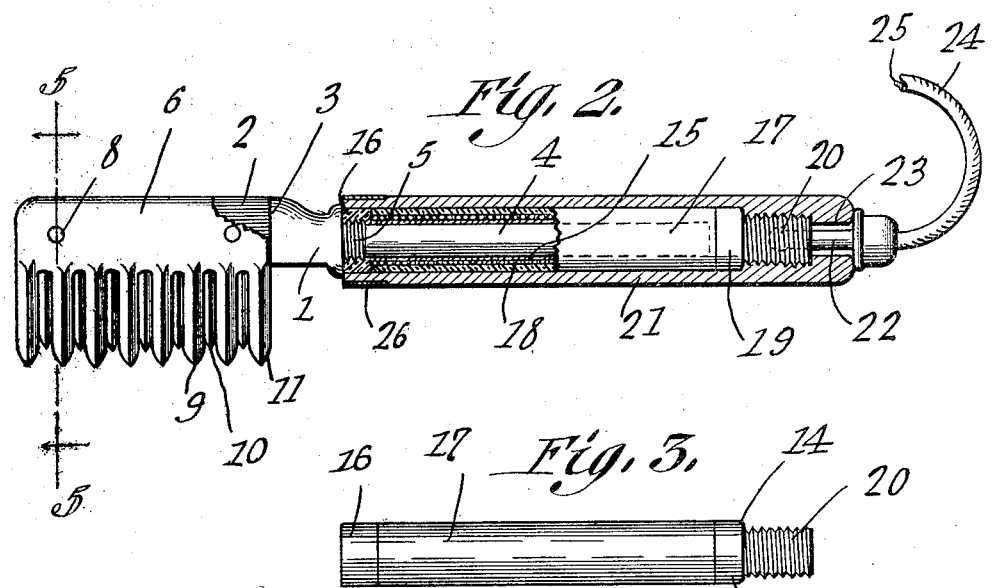
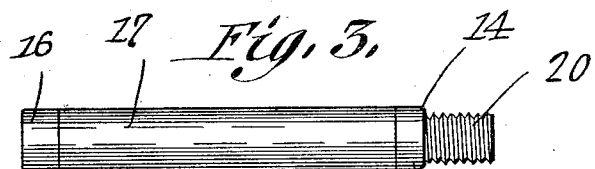
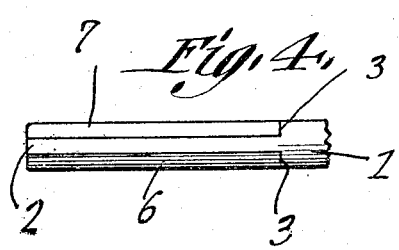
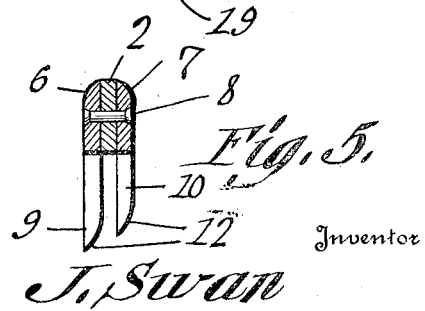

1,523,461

UNITED STATES PATENT OFFICE.

JUDGE SWAN, OF DETROIT, MICHIGAN.

COMB.

Application filed June 2, 1924. Serial No. 717,340.

*To all whom it may concern:*

Be it known that I, JUDGE SWAN, a citizen of the United States, residing at Detroit, in the county of Wayne and State of Michigan, have invented a new and useful Comb, of which the following is a specification.

It is one object of this invention to provide a comb which will be peculiarly efficient for straightening wavy or kinked hair, another object of the invention being to provide novel means for heating the comb. A further object of the invention is to provide a device of the class described which may be taken apart readily to permit the heating element to be removed or repaired.

It is within the province of the disclosure to improve generally and to enhance the utility of devices of that sort to which the invention appertains.

Although a preferred form has been shown in the drawing, it will be understood that a mechanic, working within the scope of what is claimed, may make changes, without departing from the spirit of the invention.

In the drawings:—Figure 1 shows in elevation, a device constructed in accordance with the invention; Figure 2 is a longitudinal section wherein parts remain in elevation; Figure 3 is an elevation showing the heating element; Figure 4 is a top plan of the head of the comb; Figure 5 is a cross section on the line 5—5 of Figure 2.

The comb forming the subject matter of this application comprises a metal body 1 provided at one end with a thinned extension 2 forming shoulders 3 at the outer end of the body 1, the body being connected to a reduced shank 4, the shank being threaded at 5, where it joins the body 1.

Plates 6 and 7 are disposed on opposite sides of the extension 2 of the body 1 and abut against the shoulders 3, the plates being held on the extension 2 by securing elements 8, such as rivets. The teeth 9 of the plate 6 are longer than the teeth 10 of the plate 7, as shown in Figure 5, the teeth 10 alternating with the teeth 9, as Figures 1 and 2 will show. The teeth 9 and 10 may be constructed in any desired way, but, ordinarily, they are pointed as at 11, and are beveled in a common direction transversely of the head of the comb, as denoted by the numeral 12 in Figure 5.

The device includes an electric heating element 14, which may be constructed as desired. Ordinarily, the heating element 14 embodies an inner tubular member 15, made of insulating material, and provided at one end with a thickened circumferential flange 16 against which abuts one end of an outer tubular member 17, fashioned from insulating material, a resistance winding 18 being disposed between the tubular members 17 and 15. The tubular member 17 of the heating element is surrounded at its outer end by a cap 19 carrying a hollow screw 20. In assembling the device, the heating element 14 is slipped over the shank 4 of the body 1, and the flange 16 of the heating element is engaged with the threads 5 of the shank 4, the heating element abutting against the body 1. Over the heating element 14 is slid a tubular handle 21, the handle being rotated to engage with the reduced stem or hollow screw 20 which forms part of the heating element. The inner end of the handle 21 abuts against the body 1, as disclosed in Figure 2. The resistance winding 18 may be brought into an electric circuit in any desired way, for instance, by a common plug coupling 22 insertible into the stem or screw 20, through an opening 23 in the outer end of the handle 21 and carrying the usual flexible guard 24 for the line conductors 25.

The construction of the device is such that it may be taken down readily to permit the heating element 14 to be removed or repaired. The handle 20 may be surrounded at its inner end by a reinforcing band 26, and the handle may be provided with a longitudinal opening 27 wherein is located a thermometer 28 indicating the temperature which has been attained. The metallic plates 6 and 7, and their teeth 9 and 10 are heated by conduction from the shank 4 and, owing to this construction, there will be no probability that the hair of the operator will be burned or singed.

I claim:—

1. A comb comprising a body provided at one end with a head and equipped at its other end with a shank, a heating element surrounding the shank and threaded at its inner end upon the shank, and a handle surrounding the heating element and threaded at its outer end on the outer end of the heating element.

2. A comb comprising a body having a head and a shank, a handle engaged with the shank, a heating element within the handle and about the shank, and a thermometer carried by the handle in operative relation to the heating element.

In testimony that I claim the foregoing as my own, I have hereto affixed my signature in the presence of two witnesses.

JUDGE SWAN.

Witnesses:
   ALBERT A. ELATE,
   PROSSER JONES.